United States Patent
Chinni et al.

(10) Patent No.: US 12,189,626 B1
(45) Date of Patent: Jan. 7, 2025

(54) AUTOMATIC QUERY OPTIMIZATION

(71) Applicant: Rubrik, Inc., Palo Alto, CA (US)

(72) Inventors: Manjunath Chinni, Saratoga, CA (US); Gabriel Adrian Lam, Mercer Island, WA (US); Travis Willem Morrissey, Pleasanton, CA (US); Hang Yang, Redwood City, CA (US); Rajorshi Kumar Sen, Redmond, WA (US); Abhishek Kumar, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/231,680

(22) Filed: Aug. 8, 2023

(51) Int. Cl.
*G06F 16/2453* (2019.01)
*G06F 11/34* (2006.01)
*G06F 16/22* (2019.01)

(52) U.S. Cl.
CPC .... *G06F 16/24539* (2019.01); *G06F 11/3419* (2013.01); *G06F 11/3428* (2013.01); *G06F 16/2255* (2019.01)

(58) Field of Classification Search
CPC .......... G06F 16/24539; G06F 11/3419; G06F 11/3428; G06F 16/2255
See application file for complete search history.

(56) References Cited

U.S. PATENT DOCUMENTS

| | | | |
|---|---|---|---|
| 2006/0161528 A1* | 7/2006 | Dettinger | G06F 16/284 |
| 2014/0101113 A1* | 4/2014 | Zhang | H04L 67/5681 |
| | | | 707/E17.002 |
| 2016/0283607 A1* | 9/2016 | Bain | G06F 16/84 |
| 2019/0213275 A1* | 7/2019 | Shankar | G06F 16/2358 |
| 2021/0334272 A1* | 10/2021 | Mathew | G06F 16/2453 |
| 2023/0325454 A1* | 10/2023 | Seletskiy | H04L 67/306 |
| | | | 709/203 |

* cited by examiner

*Primary Examiner* — Cam Y T Truong
(74) *Attorney, Agent, or Firm* — Holland & Hart LLP

(57) ABSTRACT

Methods, systems, and devices for data management are described. In some systems, a client may request for a data management system (DMS) to execute a first instance of a query to obtain, from a database, first information that is responsive to the query. The DMS may identify, in response to the query being executed in an execution time that is greater than a threshold amount of time, an improved version of the query that is associated with a second execution time that is less than the threshold amount of time. The DMS may store the improved version of the query. The DMS may retrieve the improved version of the query in response to receiving a second instance of the query. The DMS may execute the improved version of the query after retrieving the improved version from storage to obtain, from the database, second information that is responsive to the query.

17 Claims, 10 Drawing Sheets

AUTOMATIC QUERY OPTIMIZATION

FIELD OF TECHNOLOGY

The present disclosure relates generally to data management, including techniques for automatic query optimization.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A data management system (DMS) may provide backup and recovery services to one or more clients. In some systems, a client may request the DMS to execute one or more queries to obtain or retrieve data for the client (e.g., in support of various services that the DMS might provide to the client). For example, the DMS may retrieve metadata or other information from a structured query language (SQL) database to help with providing backup, recovery, and security features to clients. A query, data subject to the query, or both may be client-specific in some cases, such that a query for one client or application may not execute in the same manner (e.g., with the same latency or other performance aspect) for another client or application. Additionally, or alternatively, in some examples, a query may perform well during testing, but may not execute reliably or efficiently in a production deployment environment. If the DMS executes a suboptimal query (e.g., a query that takes a relatively long time to complete), the query may increase latency and processing and reduce performance, which may impact client satisfaction, among other possible drawbacks.

Techniques, systems, and devices described herein provide for a DMS to automatically identify suboptimal queries and store an updated version of such queries for subsequent use by certain clients and applications (e.g., context-aware queries). If the DMS receives a request to execute a query for a given client, the DMS may scan a first database to determine whether a result of the query has already been obtained and stored, in which case the DMS may retrieve the result and complete the query. If no result of the query has been stored, the DMS may then scan a second database (e.g., a fingerprint database) to determine whether an optimized (e.g., improved, more optimal) version of the query for the client has already been stored. If no optimized version or results have previously been obtained, the DMS may execute the query. If the query takes longer than a threshold time to execute, the DMS may utilize an optimization engine to optimize the query by analyzing the query and finding changes that may improve query performance for the client and application.

The DMS may verify the results and timing of the optimized query to ensure reliability. Once the query is verified, the DMS may hash the optimized query to generate a fingerprint of the query (e.g., a hashing function that represents the more optimal query). The DMS may store the fingerprint in the fingerprint database. The fingerprint may be associated with (e.g., mapped to or hashed with) the client and respective application. When the client subsequently requests the query be executed, the DMS may obtain the fingerprint and execute the more optimal version of the query to reduce latency and improve reliability.

Figure 1:
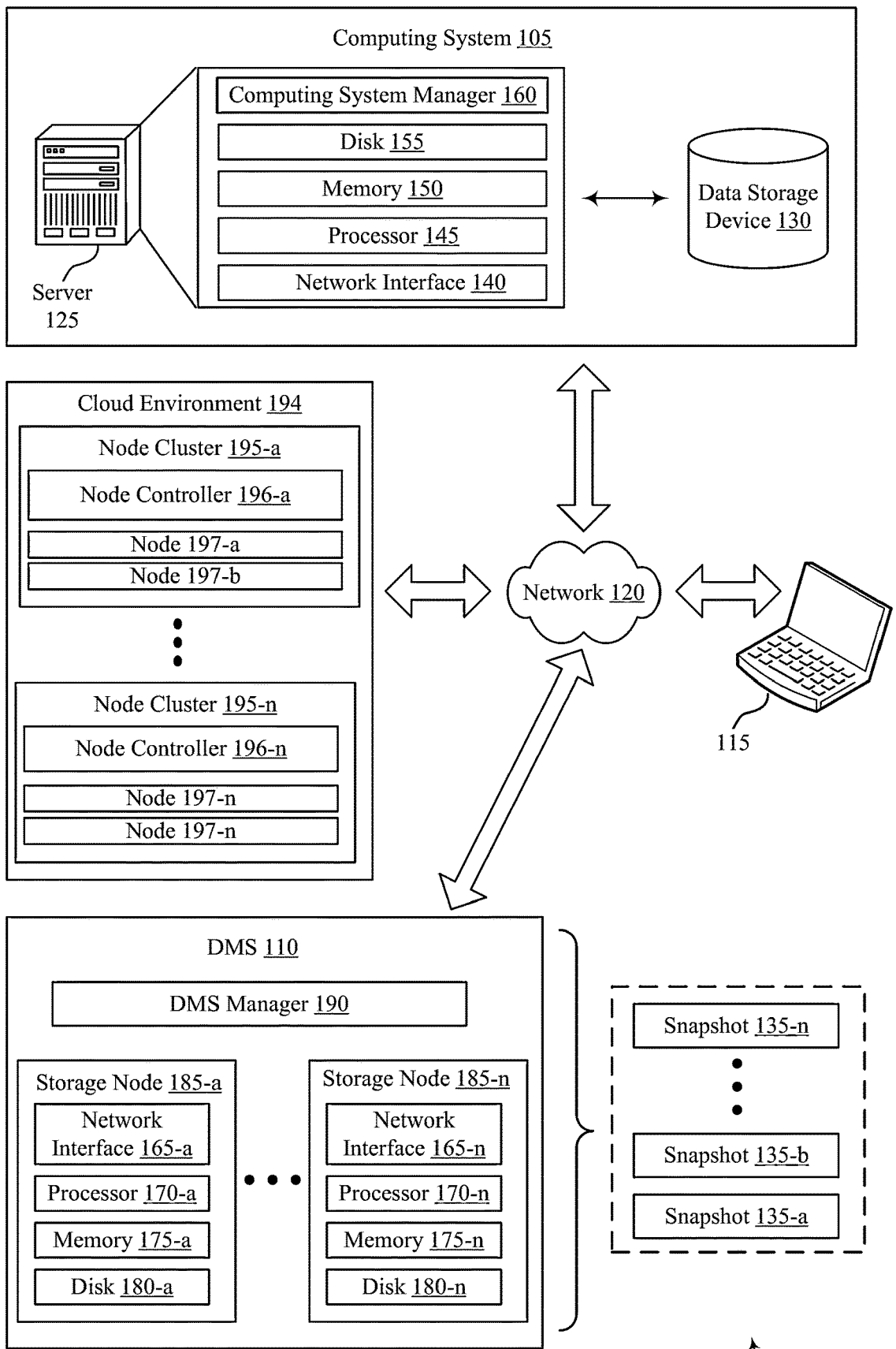
FIG. 1 shows an example of a computing environment that supports automatic query optimization in accordance with aspects of the present disclosure.

FIG. 1 shows an example of a computing environment 100 that supports automatic query optimization in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random-access memory (SRAM), dynamic random-access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though shown as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example shown in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In the DMS 110, the control-plane may be common to multiple customers/tenants, where each customer/tenant may have a private data-plane. For example, as described herein, the DMS 110 may transfer snapshots 135 via the network 120 to a cloud environment 194, where each customer/tenant may have a private cloud environment (e.g., Microsoft Azure) which includes a node cluster 195 across which customer or tenant data is stored. Each node cluster 195 may include a node controller 196 which manages the nodes 197 of the node cluster 195. Separating each customer/tenant's data into separate node clusters 195 provides fault isolation for the different customers/tenants and provides security by limiting access to data for each customer/tenant. Node clusters 195 may be hosted externally (e.g., on one or more external cloud environments, such as Microsoft Azure). The control-plane (e.g., the DMS, and specifically the DMS manager 190) may manage tasks, such as storing backups or snapshots or performing restorations, across the multiple node clusters 195.

The DMS 110 may operate one or more database instances that support the functions (e.g., the data protection services) of the DMS 110. For example, the one or more database instances may be used to store metadata that supports protecting the data of one or more customers (e.g., protecting the data of the computing system 105). In some examples, the DMS 110 may operate a first database instance that includes multiple databases for one or more customers. In some examples, each database may be associated with a respective customer, a respective data object (e.g., a physical machine, VM, VCenter, database, file system, etc.), or a combination thereof.

For example, the DMS 110 may protect data owned by a particular customer—e.g., the DMS 110 may create backups for, create snapshots for, and/or provide security analysis for the data owned by the customer. To support the protection of the data owned by the customer (which may be referred to as "customer data"), the DMS 110 may store, in a table of a first database, metadata associated with the protection of the customer data. For instance, to support a snapshot service for the customer data, in addition to a snapshot taken for the customer data, the DMS 110 may store information about the snapshot, such as when the snapshot was taken, a data object the snapshot was taken for, a retention duration for the snapshot, an expiration date for the snapshot, etc.

In some examples, a customer may request the DMS 110 to execute one or more queries to obtain or retrieve data for the customer (e.g., in support of various services that the DMS 110 might provide to the customer). For example, the DMS 110 may retrieve metadata or other information from an SQL database to help with providing backup, recovery, and security features to customers. A query, data subject to the query, or both may be client-specific in some cases, such that a query for one customer or application may not execute in the same manner (e.g., with the same latency or other performance aspect) for another customer or application. Additionally, or alternatively, in some examples, a query may perform well during testing, but may not execute reliably or efficiency in a production deployment environment. If the DMS 110 executes a suboptimal query (e.g., a query that takes a relatively long time to complete), a client query may increase latency and processing and reduce performance, which may impact client satisfaction, among other possible draw backs.

Techniques, systems, and devices described herein provide for the DMS 110 to automatically identify suboptimal queries and store an updated version of such queries for subsequent use by certain customers and applications (e.g., context-aware queries). If the DMS 110 receives a request to execute a query for a given client, the DMS 110 may scan a first database to determine whether a result of the query has already been obtained and stored, in which case the DMS 110 may retrieve the result and complete the query. If no result of the query has been stored, the DMS 110 may scan a second database (e.g., a fingerprint database) to determine whether an optimized (e.g., improved, more optimal) version of the query for the client has already been stored. If no optimized version or results have previously been obtained, the DMS 110 may execute the query. If the query takes longer than a threshold time to execute, the DMS 110 may utilize an optimization engine to optimize the query by analyzing the query and finding changes that may improve query performance for the client and application.

The DMS 110 may verify the results and timing of the optimized query to ensure reliability. Once the query is verified, the DMS 110 may hash the optimized query to generate a fingerprint of the query (e.g., a hashing function that represents the more optimal query). The DMS 110 may store the fingerprint in the fingerprint database. The fingerprint may be associated with (e.g., mapped to or hashed with) the customer and respective application. When the customer subsequently requests the query be executed, the DMS 110 may obtain the fingerprint and execute the more optimal version of the query to reduce latency and improve reliability.

Figure 2:
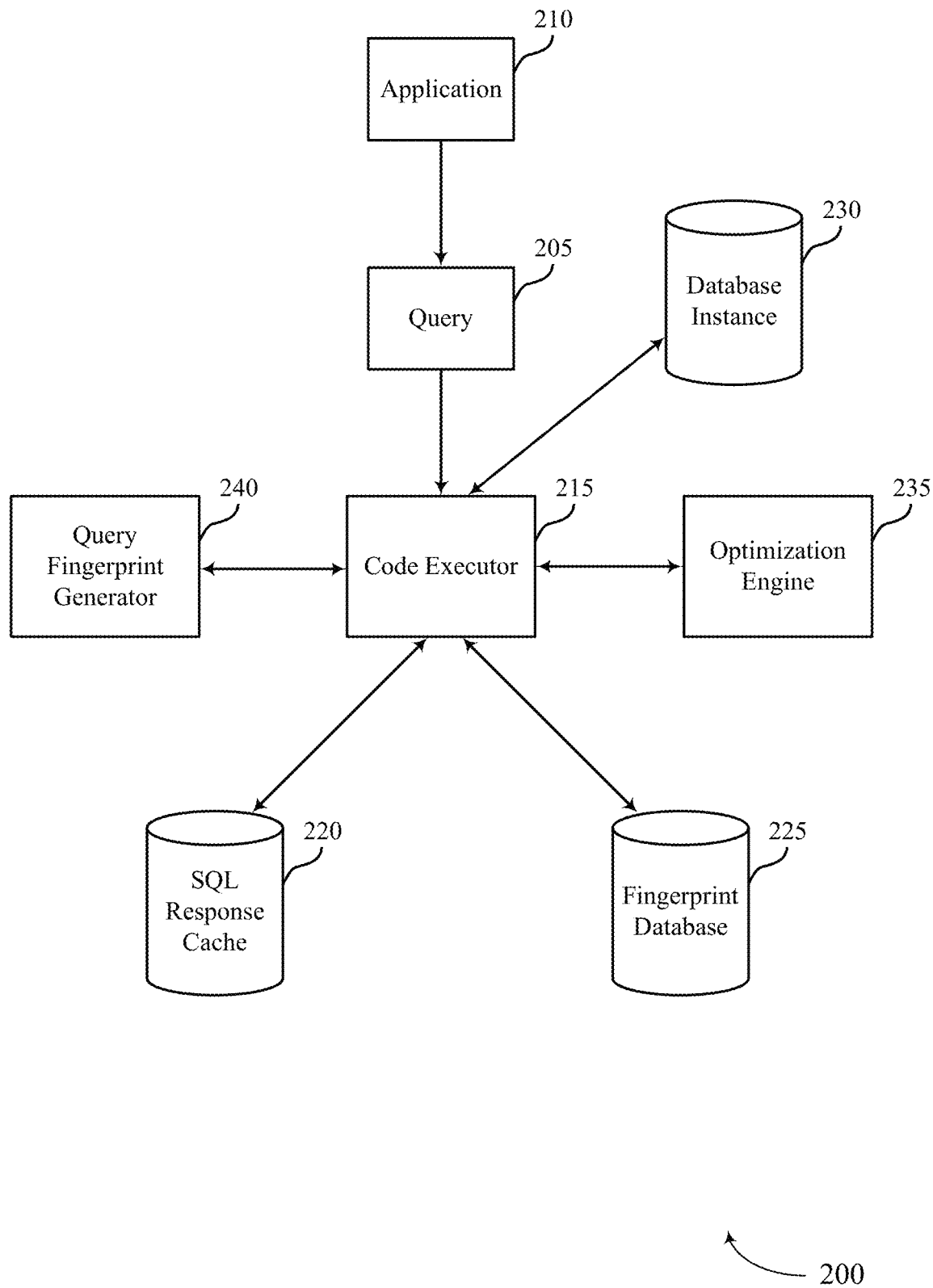
FIG. 2 shows an example of a query execution diagram that supports automatic query optimization in accordance with aspects of the present disclosure.

FIG. 2 shows an example of a query execution diagram 200 that supports automatic query optimization in accordance with aspects of the present disclosure. The query execution diagram 200 may implement or be implemented by aspects of the computing environment 100 described with reference to FIG. 1. For example, the query execution diagram 200 illustrates components within a DMS, which may represent an example of a DMS 110 as described with reference to FIG. 1. The components may be operable to determine whether a query 205 is suboptimal, improve the query 205, and execute the improved query 205. The components of the DMS may include, for example, a code executor 215, an SQL response cache 220, a fingerprint database 225, a database instance 230, an optimization engine 235, and a query fingerprint generator 240, among other components. It is to be understood that the DMS may include any quantity of one or more components that are operable to perform the query improvement techniques described herein, including the components illustrated in FIG. 2, as well as any other components not illustrated.

The DMS may receive a query 205. That is, a client may request the DMS to display or provide some information to the client. As an example, a query 205 may request to retrieve and view information regarding a set of different VMs stored in a database managed by the DMS, or some other type of data or information managed by the DMS. The client's request may arrive at the DMS via the query 205. The query 205 may be an SQL query 205. The code executor 215 may receive the query 205 from an application 210, which may be any type of application that issues SQL queries. For example, the application 210 from which the code executor 215 receives the query 205 may be an application executed by or supported by the DMS, a client application, or some other type of application. The code executor 215 may represent an example of a component (e.g., software and/or hardware) within the DMS that is responsible for running queries and returning results to the caller. As described herein, the code executor 215 may be operable to determine whether the query 205 is suboptimal or not, to facilitate improvement of the query 205 if needed, and to execute the query 205. In some examples, the code executor 215 may be referred to as a query executor.

The code executor 215 may receive the query 205 and may hash the query 205 to generate a fingerprint of the query 205, which may be a hashing function that uniquely identifies the query 205. The code executor 215 may first check an SQL response cache 220 to determine whether a previous response for the query 205 by the client has been obtained and stored. The code executor 215 may scan for the fingerprint of the query 205 in the SQL response cache 220. If the fingerprint is in the cache, the fingerprint may include or point to a response for the query 205. For example, when the code executor 215 executes queries, the code executor 215 may store a result of each query (e.g., the obtained information) in the SQL response cache 220 by linking the result to a fingerprint that represents the query and the client/application associated with the query. Additionally, or alternatively, the code executor 215 may store a result of a query in the SQL response cache 220 if the query takes more than a threshold time period to execute (e.g., the code executor 215 may store results for all queries that take more than five seconds to execute, or some other threshold time period). If the data in the database instance 230 is updated, deleted, or otherwise changed, the code executor 215 may remove the fingerprint from the SQL response cache 220, as the same query may now return the changed data and the previously stored response may no longer be valid. Thus, if the query 205 has already been executed successfully for the same client, and the data has not changed, the code executor 215 may identify and retrieve the fingerprint associated with the previously obtained response from the SQL response cache 220 and may provide the previously obtained response to the client, which may result in a completion of the query 205.

If the query 205 has not already been executed, if a response for the client is not available in the SQL response cache 220, or both, the code executor 215 may subsequently check the fingerprint database 225. The code executor 215 may scan the fingerprint database 225 to determine whether the fingerprint associated with the query 205 and the client that requested the query 205 is stored in the fingerprint database 225. For example, the code executor 215 may determine whether a fingerprint in the fingerprint database 225 matches the fingerprint generated by the code executor 215 upon receipt of the query 205. The fingerprint database 225 may be a database that stores fingerprints (e.g., hashing functions) that represent queries that have been improved by the code executor 215. The fingerprints may be unique identifiers for a query, and may be context-aware. For example, the fingerprints may be unique to the query, the client, the dataset, the corresponding application, or any combination thereof. If there is a fingerprint associated with the query 205 and the client in the fingerprint database 225, the code executor 215 may retrieve an improved query that is associated with (e.g., mapped to) the fingerprint. For example, each fingerprint in the fingerprint database 225 may point to or otherwise be associated with one or more improved queries. That is, the code executor 215 may execute the improved query instead of the query 205 received from the client, which may reduce latency and improve reliability.

If there is not a fingerprint associated with the query 205 and the client in the fingerprint database 225, the code executor 215 may run the query 205 and wait for a response. The code executor 215 may execute the query 205 by sending the query 205 or information associated with the query 205 (e.g., a request for information) to the database instance 230. The database instance 230 may be a database managed by the DMS, such as a security cloud database, or some other database that stores information associated with the client's data. The code executor 215 may monitor for a response from the database instance 230. For example, the query 205 may be complete when the database instance 230 returns the requested information (e.g., data and/or metadata) to the code executor 215 or the client. The code executor 215 may keep track of how long the query 205 takes to execute. The code executor 215 may start a timer when the query 205 is sent to the database instance 230 or may store time stamps associated with a first time at which the query 205 is sent and a second time at which the information is retrieved, or both to determine the execution time.

The code executor 215 may compare the execution time of the query 205 with a threshold amount of time (e.g., a threshold time period). The threshold amount of time may be configured by the DMS, by a client, or based on one or more other parameters or factors, in some examples. The threshold amount of time may be, for example, one second, or some other time period within which a query 205 should be complete for the DMS to maintain secure, reliable, and efficient services. If the information is returned within the threshold amount of time (e.g., the execution time is less than or equal to the threshold amount of time), the code executor 215 may return the information to the client and the query 205 may be complete. In some examples, the code executor 215 may hash the results and may store a fingerprint of the results in the SQL response cache 220, such that the results may be retrieved efficiently if the query 205 is requested again. In some examples, the code executor 215 may store the results in the SQL response cache 220 based on the corresponding query 205 being executed within the threshold amount of time. And in some examples, as an additional or alternative factor, the code executor 215 storing the results in the SQL response cache 220 may be based on the corresponding query 205 being received or performed at least a threshold quantity of times within a threshold time period. For example, the code executor 215 may store results for relatively frequent queries 205 to reduce a quantity of times the DMS executes such queries, thereby improving system performance.

If the execution time is greater than the threshold amount of time, the code executor 215 may determine that the query 205 is suboptimal (e.g., takes a relatively long time to complete). In some cases, a suboptimal query may cause performance issues in a production environment, which may affect clients of the DMS. Suboptimal queries may not be caught by designers and engineers during code review and testing phases prior to deployment of the queries, in some examples, because the testing environments may not mimic the exact conditions of a production environment. Additionally, or alternatively, as data managed by the DMS grows, one or more queries may take more time to execute and may thereby become suboptimal queries over time.

Techniques, systems, and devices described herein provide for the DMS to automatically identify and improve suboptimal queries (e.g., automatic query analysis as part of a query executor layer). For example, if the code executor 215 identifies that the query 205 is suboptimal based on the execution time of the query 205 being greater than the threshold amount of time, the code executor 215 may send the query 205 to the optimization engine 235 to be improved, which may improve query performance for subsequent execution attempts for the query 205. The optimization engine 235 may represent an example of software and/or hardware that is configured to improve performance of a query. The optimization engine 235 may analyze the query 205 and find changes that may improve query performance for the client and corresponding application. In some examples, the optimization engine 235 may utilize a machine learning or other prediction model. Additionally, or alternatively, the optimization engine 235 may utilize past examples of the query 205 or other queries to improve the performance. In some other examples, the optimization engine 235 may use other software or tools to create a variant of the query 205. The optimization engine 235 may ultimately generate an improved query that may be executed within a shorter execution time than the initial query 205 and may return the same results as the initial query 205. The optimization engine 235 may send the improved query (e.g., an optimal or more optimized query) back to the code executor 215.

The code executor 215 may receive the improved query from the optimization engine 235 and may run the improved query again. The code executor 215 may run the improved query to verify data integrity and timing of the improved query. For example, the code executor 215 may measure an execution time for the improved query and determine whether the execution time is less than or equal to the threshold amount of time. The code executor 215 may additionally, or alternatively, compare the results obtained from executing the improved query with the results obtained from executing the initial version of the query 205. For example, the code executor 215 may hash the results associated with the improved query and may compare a hashing function associated with those results with the hashing function stored in the SQL response cache 220 for the query 205. In some examples, the code executor 215 may determine that the results are correct if at least a threshold percent of the results are the same.

If the execution time is greater than the threshold amount of time, or if the returned data is different than the cached data for the query 205, or both, the code executor 215 may return the query to the optimization engine 235 for further optimization (e.g., the code executor 215 may iteratively perform the described steps until an improved query is achieved). Additionally, or alternatively, the code executor 215 may refrain from performing more than one iteration of optimization and may instead return to executing other queries that may be received from the clients.

If the improved query is verified (e.g., the improved query executes in less than the threshold amount of time and returns the correct information), the code executor 215 may store the improved query for subsequent use. The code executor 215 may store the improved query by hashing the improved query along with any related metadata and storing a fingerprint or hashing function that represents the improved query in the fingerprint database 225. The fingerprint may be associated with (e.g., hashed with or stored with) another fingerprint that represents the original query, client, and the application associated with the query. That is, the improved query may be context-aware and may not be used for other clients or applications. The code executor 215 may similarly store the response to the improved query as a hashing function in the SQL response cache 220.

The code executor 215 may thereby improve performance of a query using the techniques described herein. If the code executor 215 subsequently receives a request to perform the same query 205 for the same client, the code executor 215 may hash the query and scan the fingerprint database 225 for the corresponding fingerprint. The code executor 215 may identify a matching fingerprint in the fingerprint database 225 that points to the improved query. The code executor 215 may execute the improved query instead of the query 205 received from the client to reduce execution time, improve performance, and reduce processing, among other examples. That is, if the code executor 215 receives a same query fingerprint for a same customer as a query fingerprint that has already been improved, the code executor 215 may execute the improved version of the SQL.

The code executor 215 may facilitate such improvements of queries automatically and autonomously without assistance from an engineer or designer of the DMS, which may reduce latency and improve efficiency of the system. In some examples, the code executor 215 or some other component of the DMS may populate the optimization engine 235 asynchronously. For example, if the code executor 215 receives a query and determines the query is suboptimal, the code executor 215 may trigger the optimization engine 235 to improve the query while the code executor 215 performs other tasks. The code executor 215 may return to the optimization engine 235 to utilize the improved query if the code executor 215 receives a request for the same query. Additionally, or alternatively, the DMS may pre-populate the fingerprint database 225 with one or more improved queries proactively before the queries are requested or during one or more background test runs (e.g., without live query requests from the customer).

Figure 3:
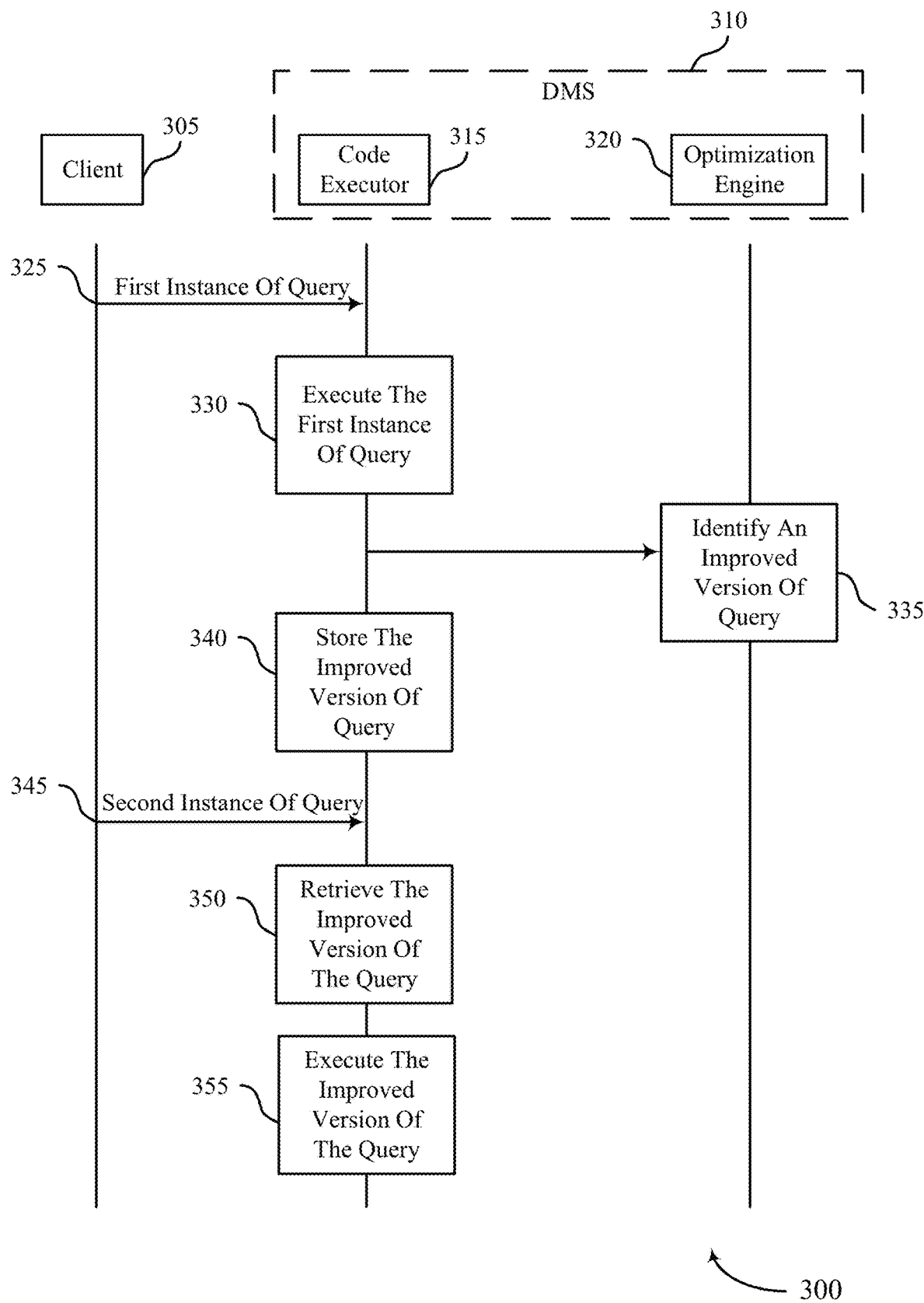
FIG. 3 shows an example of a process flow that supports automatic query optimization in accordance with aspects of the present disclosure.

FIG. 3 shows an example of a process flow 300 that supports automatic query optimization in accordance with aspects of the present disclosure. The process flow 300 may implement or be implemented by aspects of FIGS. 1 and 2. For example, the process flow 300 may be implemented by DMS 310 and a client 305, which may represent examples of a corresponding DMS and computing device as described with reference to FIGS. 1 and 2. In this example, the DMS 310 may include one or more components, such as the code executor 315 and the optimization engine 320, among other components, which may represent examples of corresponding components as described with reference to FIG. 2. The DMS 310 may improve a query and store the improved version of the query for subsequent use.

In some aspects, the operations illustrated in the process flow 300 may be performed by hardware (e.g., including circuitry, processing blocks, logic components, and other components), code (e.g., software or firmware) executed by a processor, or any combination thereof. For example, aspects of the process flow 300 may be implemented or managed by a DMS, a query component, or some other software or application that is associated with data backup and recovery.

At 325, in some examples, the client 305 may send a first instance of a query to the DMS 310. For example, the client 305 may request that the DMS 310 execute a query for a given application and/or data set. The client 305 may send the request via a user interface or some other interface for communicating with the DMS 310. Additionally, or alternatively, in some examples, the query may be received from another component or entity associated with the DMS 310, such as some application or other entity that executes SQL.

At 330, the DMS 310 may execute the first instance of the query. The query may be executed by the code executor 315, or some other component of the DMS 310. The query may be executed to retrieve or obtain first information that is responsive to the query. The first information may be retrieved from a corresponding database. In this example, the query may be executed within a first execution time that may be greater than a threshold amount of time. For example, a time period between a first time at which the DMS 310 starts to execute the query and a second time at which the query is complete (e.g., when the first information is retrieved) may be greater than a threshold.

In some examples, before the DMS 310 executes the first instance of the query, the DMS 310 may scan one or more databases or caches to identify whether a response to the query has already been obtained and stored, whether an improved version of the query has already been obtained and stored, or both, as described in further detail elsewhere herein, including with reference to FIG. 2. In this example, the DMS 310 may determine that no previous response or improved version of the query is obtained, and the DMS 310 may accordingly execute the first instance of the query.

At 335, the DMS 310 may identify an improved version of the query. The DMS 310 may identify the improved version of the query based on the execution time of the first instance of the query being greater than the threshold amount of time. For example, the code executor 315 may send an indication of the execution time exceeding the threshold to the optimization engine 320 or some other component of the DMS 310, and the optimization engine 320 may identify an improved version of the query accordingly. The optimization engine may utilize machine learning, previous query results, one or more algorithms, other techniques, or any combination thereof to obtain a variant of the query that may be executed in a shorter time period than the first instance of the query.

At 340, the DMS 310 may store the improved version of the query. The improved version of the query may be stored in a fingerprint database. In some examples, the DMS 310 may generate, in accordance with a hashing function, a fingerprint for the query, and the DMS 310 may store the fingerprint for the query in the fingerprint database. The fingerprint for the query may be mapped to the improved version of the query or a hashing function that represents the improved version of the query in the fingerprint database. In some examples, the optimization engine 320 may store the improved version, or the optimization engine 320 may send the improved version to the code executor 315 or some other component for hashing and storage.

In some examples, the DMS 310 may execute the improved version of the query before storing the improved version of the query. The DMS 310 may determine whether a second execution time of the improved version of the query is less than the threshold amount of time. The DMS 310 may compare second information obtained in response to the improved version of the query with first information obtained in response to the first instance of the query. The DMS 310 may store the improved version of the query if the second execution time is less than the threshold and the second information is the same as the first information (e.g., the improved version of the query may be verified).

At 345, in some examples, the client 305 may send a second instance of the same query to the DMS 310. For example, the client 305 may request that the DMS 310 execute the query for the same application and/or data set as the first instance of the query. The client 305 may send the request via a user interface or some other interface for communicating with the DMS 310.

At 350, in response to receiving the second instance of the query, the DMS 310 may retrieve the improved version of the query from storage. For example, the DMS 310 may generate, in accordance with a hashing function, a fingerprint for the query in response to receiving the second instance of the query. The DMS 310 may scan the fingerprint database for the fingerprint. The DMS 310 may identify the fingerprint, which may point to the improved version of the query in the fingerprint database. The DMS 310 may retrieve the improved version of the query accordingly.

At 355, after retrieving the improved version of the query from storage, the DMS 310 may execute the improved version of the query to obtain second information that is responsive to the query. The DMS 310 may present the second information to the client 305, in some examples.

The DMS 310 may thereby automatically identify a query that may be suboptimal (e.g., may take a relatively long time to execute) and improve the query for subsequent use. By storing the improved version of the query in a context-aware format, the DMS 310 may be able to retrieve and reuse the improved version of the query when a client 305 requests the same query in the same context at a later time, which may improve reliability and reduce latency associated with query execution.

Figure 4:
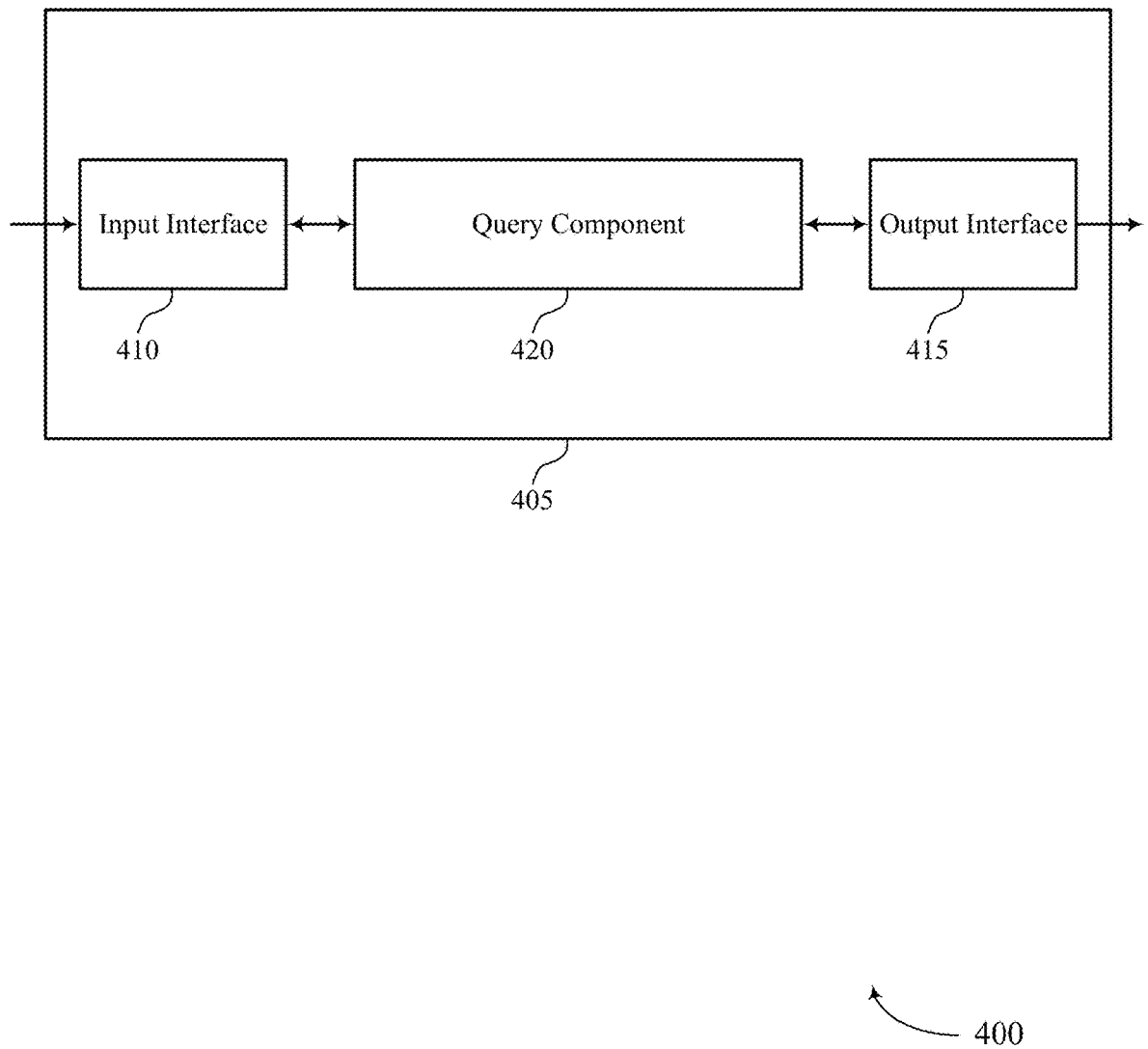
FIGS. 4 and 5 show block diagrams of devices that support automatic query optimization in accordance with aspects of the present disclosure.

FIG. 4 shows a block diagram 400 of a system 405 that supports automatic query optimization in accordance with aspects of the present disclosure. The system 405 may be an example of aspects of a DMS as described herein. The system 405 may include an input interface 410, an output interface 415, and a query component 420. The system 405, or one or more components of the system 405 (e.g., the input interface 410, the output interface 415, and the query component 420), may include at least one processor, which may be coupled with at least one memory, to, individually or collectively, support or enable the described techniques. Each of these components may be in communication with one another (e.g., via one or more buses).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the query component 420 to support automatic query optimization. In some cases, the input interface 410 may be a component of a network interface 725 as described with reference to FIG. 7.

The output interface 415 may manage output signaling for the system 405. For example, the output interface 415 may receive signaling from other components of the system 405, such as the query component 420, and may transmit such output signaling corresponding to (e.g., representative of or otherwise based on) such signaling to other systems or devices. In some cases, the output interface 415 may be a component of a network interface 725 as described with reference to FIG. 7.

The query component 420, the input interface 410, the output interface 415, or various combinations thereof or various components thereof may be examples of means for performing various aspects of automatic query optimization as described herein. For example, the query component 420, the input interface 410, the output interface 415, or various combinations or components thereof may be capable of performing one or more of the functions described herein.

In some examples, the query component 420, the input interface 410, the output interface 415, or various combinations or components thereof may be implemented in hardware (e.g., in communications management circuitry). The hardware may include at least one of a processor, a DSP, an ASIC, an FPGA or other programmable logic device, a discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the query component 420, the input interface 410, the output interface 415, or various combinations or components thereof may be implemented in code (e.g., as communications management software or firmware) executed by at least one processor. If implemented in code executed by at least one processor, the functions of the query component 420, the input interface 410, the output interface 415, or various combinations or components thereof may be performed by a general-purpose processor, a DSP, a CPU, an ASIC, an FPGA, or any combination of these or other programmable logic devices (e.g., configured as or otherwise supporting, individually or collectively, a means for performing the functions described in the present disclosure).

In some examples, the query component 420 may be configured to perform various operations (e.g., receiving, monitoring, transmitting) using or otherwise in cooperation with the input interface 410, the output interface 415, or both. For example, the query component 420 may receive information from the input interface 410, send information to the output interface 415, or be integrated in combination with the input interface 410, the output interface 415, or both to receive information, transmit information, or perform various other operations as described herein.

For example, the query component 420 may be configured as or otherwise support a means for executing a query, in response to receiving a first instance of the query, to obtain first information from a database that is responsive to the query, where a first execution time associated with execution of the query is greater than a threshold amount of time. The query component 420 may be configured as or otherwise support a means for identifying, in response to the first execution time being greater than the threshold amount of time, an improved version of the query, the improved version associated with a second execution time that is less than or equal to the threshold amount of time. The query component 420 may be configured as or otherwise support a means for storing the improved version of the query. The query component 420 may be configured as or otherwise support a means for retrieving, in response to a receiving a second instance of the query, the improved version of the query from storage. The query component 420 may be configured as or otherwise support a means for executing, after retrieving the improved version of the query from storage, the improved version of the query to obtain second information from the database that is responsive to the query.

By including or configuring the query component 420 in accordance with examples as described herein, the system 405 (e.g., at least one processor controlling or otherwise coupled with the input interface 410, the output interface 415, the query component 420, or a combination thereof) may support techniques for reduced processing, reduced power consumption, reduced complexity and latency associated with query execution, and more efficient utilization of computing resources, among other possibilities.

Figure 5:
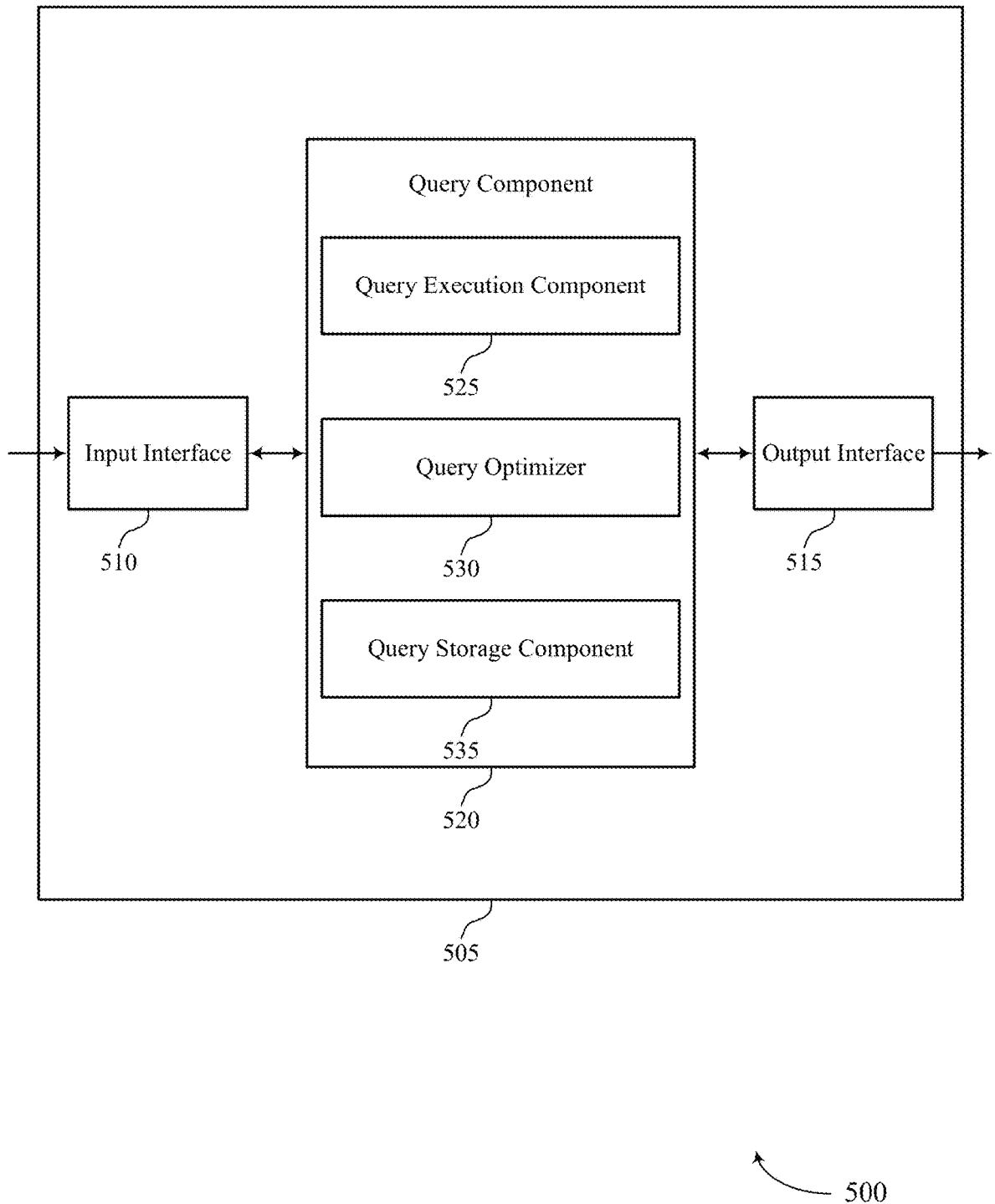

FIG. 5 shows a block diagram 500 of a system 505 that supports automatic query optimization in accordance with aspects of the present disclosure. In some examples, the system 505 may be an example of aspects of one or more components described with reference to FIG. 1, such as a DMS 110. The system 505 may be an example of aspects of a system 405 or a DMS 110 as described herein. The system 505 may include an input interface 510, an output interface 515, and a query component 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the query component 520 to support automatic query optimization. In some cases, the input interface 510 may be a component of a network interface 725 as described with reference to FIG. 7.

The output interface 515 may manage output signaling for the system 505. For example, the output interface 515 may receive signaling from other components of the system 505, such as the query component 520, and may transmit such output signaling corresponding to (e.g., representative of or otherwise based on) such signaling to other systems or devices. In some cases, the output interface 515 may be a component of a network interface 725 as described with reference to FIG. 7.

The system 505, or various components thereof, may be an example of means for performing various aspects of automatic query optimization as described herein. For example, the query component 520 may include a query execution component 525, a query optimizer 530, a query storage component 535, or any combination thereof. The query component 520 may be an example of aspects of a query component 420 as described herein. In some examples, the query component 520, or various components thereof, may be configured to perform various operations (e.g., receiving, monitoring, transmitting) using or otherwise in cooperation with the input interface 510, the output interface 515, or both. For example, the query component 520 may receive information from the input interface 510, send information to the output interface 515, or be integrated in combination with the input interface 510, the output interface 515, or both to receive information, transmit information, or perform various other operations as described herein.

The query execution component 525 may be configured as or otherwise support a means for executing a query, in response to receiving a first instance of the query, to obtain first information from a database that is responsive to the query, where a first execution time associated with execution of the query is greater than a threshold amount of time. The query optimizer 530 may be configured as or otherwise support a means for identifying, in response to the first execution time being greater than the threshold amount of time, an improved version of the query, the improved version associated with a second execution time that is less than or equal to the threshold amount of time. The query storage component 535 may be configured as or otherwise support a means for storing the improved version of the query. The query optimizer 530 may be configured as or otherwise support a means for retrieving, in response to a receiving a second instance of the query, the improved version of the query from storage. The query execution component 525 may be configured as or otherwise support a means for executing, after retrieving the improved version of the query from storage, the improved version of the query to obtain second information from the database that is responsive to the query.

Figure 6:
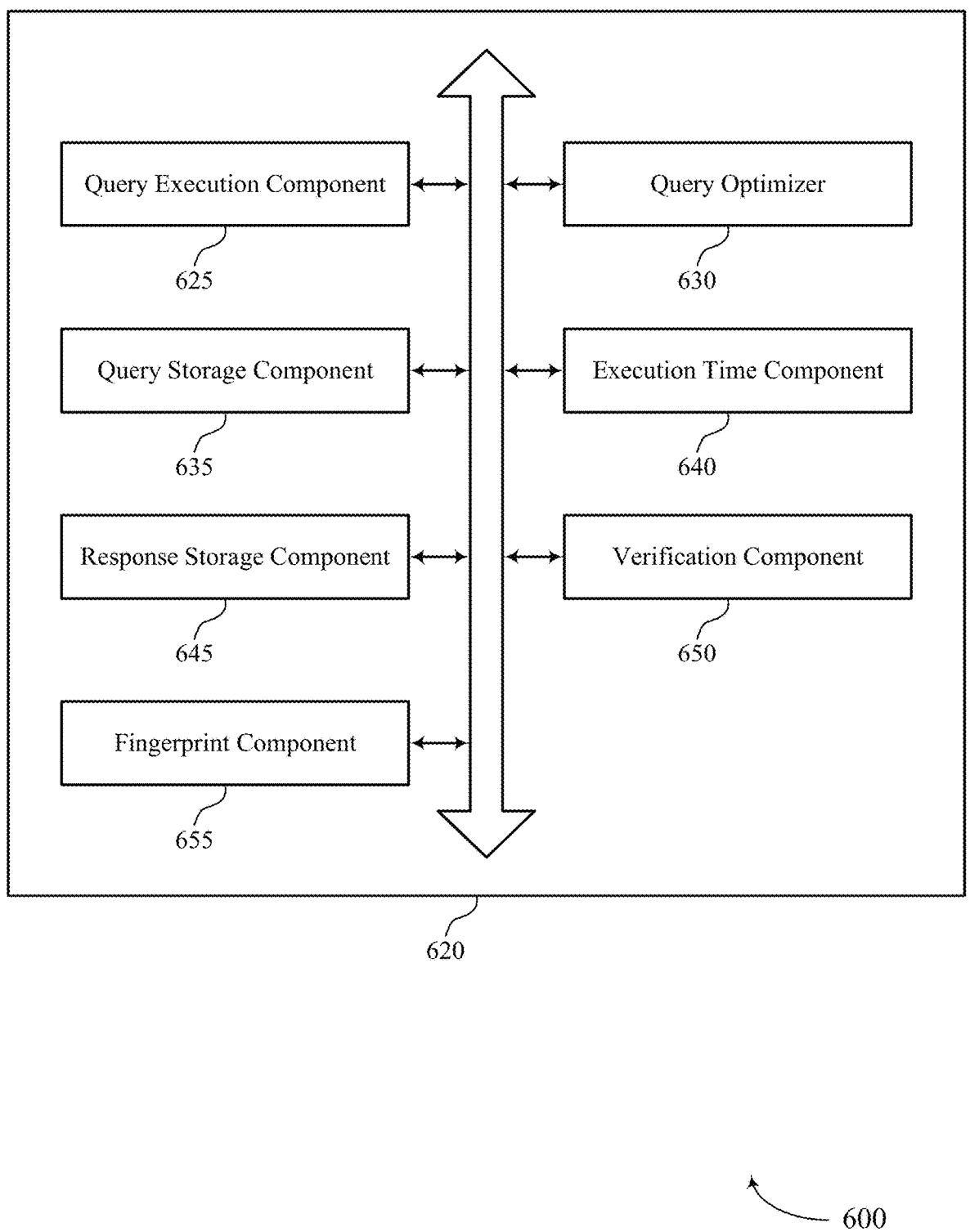
FIG. 6 shows a block diagram of a query component that supports automatic query optimization in accordance with aspects of the present disclosure.

FIG. 6 shows a block diagram 600 of a query component 620 that supports automatic query optimization in accordance with aspects of the present disclosure. The query component 620 may be an example of aspects of a query component 420, a query component 520, or both, as described herein. The query component 620, or various components thereof, may be an example of means for performing various aspects of automatic query optimization as described herein. For example, the query component 620 may include a query execution component 625, a query optimizer 630, a query storage component 635, an execution time component 640, a response storage component 645, a verification component 650, a fingerprint component 655, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The query execution component 625 may be configured as or otherwise support a means for executing a query, in response to receiving a first instance of the query, to obtain first information from a database that is responsive to the query, where a first execution time associated with execution of the query is greater than a threshold amount of time. The query optimizer 630 may be configured as or otherwise support a means for identifying, in response to the first execution time being greater than the threshold amount of time, an improved version of the query, the improved version associated with a second execution time that is less than or equal to the threshold amount of time. The query storage component 635 may be configured as or otherwise support a means for storing the improved version of the query. In some examples, the query optimizer 630 may be configured as or otherwise support a means for retrieving, in response to a receiving a second instance of the query, the improved version of the query from storage. In some examples, the query execution component 625 may be configured as or otherwise support a means for executing, after retrieving the improved version of the query from storage, the improved version of the query to obtain second information from the database that is responsive to the query.

In some examples, the query execution component 625 may be configured as or otherwise support a means for executing the improved version of the query after identifying the improved version of the query and before receiving the second instance of the query. In some examples, the execution time component 640 may be configured as or otherwise support a means for identifying the second execution time of the improved version of the query based on executing the improved version of the query, where at least one of storing the improved version of the query or retrieving the improved version of the query in response to receiving the second instance of the query is based on the second execution time being less than or equal to the threshold amount of time.

In some examples, the response storage component 645 may be configured as or otherwise support a means for storing the first information obtained by executing the query. In some examples, the query execution component 625 may be configured as or otherwise support a means for executing the improved version of the query after identifying the improved version of the query and before receiving the second instance of the query. In some examples, the verification component 650 may be configured as or otherwise support a means for comparing the second information obtained by executing the improved version of the query with the first information, where at least one of storing the improved version of the query or retrieving the improved version of the query in response to receiving the second instance of the query is based on the second information being the same as the first information.

In some examples, the fingerprint component 655 may be configured as or otherwise support a means for generating, in accordance with a hashing function, a fingerprint for the query. In some examples, the query storage component 635 may be configured as or otherwise support a means for storing the fingerprint for the query in a fingerprint database, where the fingerprint database maps the fingerprint for the query to the improved version of the query.

In some examples, at least one of the fingerprint or the improved version of the query is associated, within the fingerprint database, with a client from which the first instance of the query is received.

In some examples, the fingerprint is associated, within the fingerprint database, with the database from which the first information and the second information are obtained.

In some examples, the fingerprint component 655 may be configured as or otherwise support a means for scanning, in response to receiving the second instance of the query, the fingerprint database for the fingerprint for query, where retrieving the improved version of the query from the storage is based on the scanning.

In some examples, the response storage component 645 may be configured as or otherwise support a means for storing, in a response cache, a fingerprint for the query and the second information obtained in response to the improved version of the query, where the response cache includes one or more fingerprints for one or more queries and one or more sets of information that are responsive to the one or more queries.

In some examples, the response storage component 645 may be configured as or otherwise support a means for identifying a change in at least a portion of the second information in the database. In some examples, the response storage component 645 may be configured as or otherwise support a means for deleting, in response to identifying the change, the second information from the response cache.

In some examples, the fingerprint component 655 may be configured as or otherwise support a means for generating, in accordance with a hashing function, a fingerprint for the query in response to receiving the first instance of the query. In some examples, the response storage component 645 may be configured as or otherwise support a means for scanning a response cache for the fingerprint for the query, where the response cache includes one or more fingerprints for one or more queries and one or more sets of information that are responsive to the one or more queries, and where executing the query is based on an absence of the fingerprint in the response cache.

In some examples, the fingerprint component 655 may be configured as or otherwise support a means for generating, in accordance with a hashing function, a fingerprint for the query in response to receiving the first instance of the query. In some examples, the query storage component 635 may be configured as or otherwise support a means for scanning a fingerprint database for the fingerprint for the query, where the fingerprint database includes one or more fingerprints for one or more queries and one or more improved versions of the one or more queries, where executing the query is based on an absence of the fingerprint in the fingerprint database.

Figure 7:
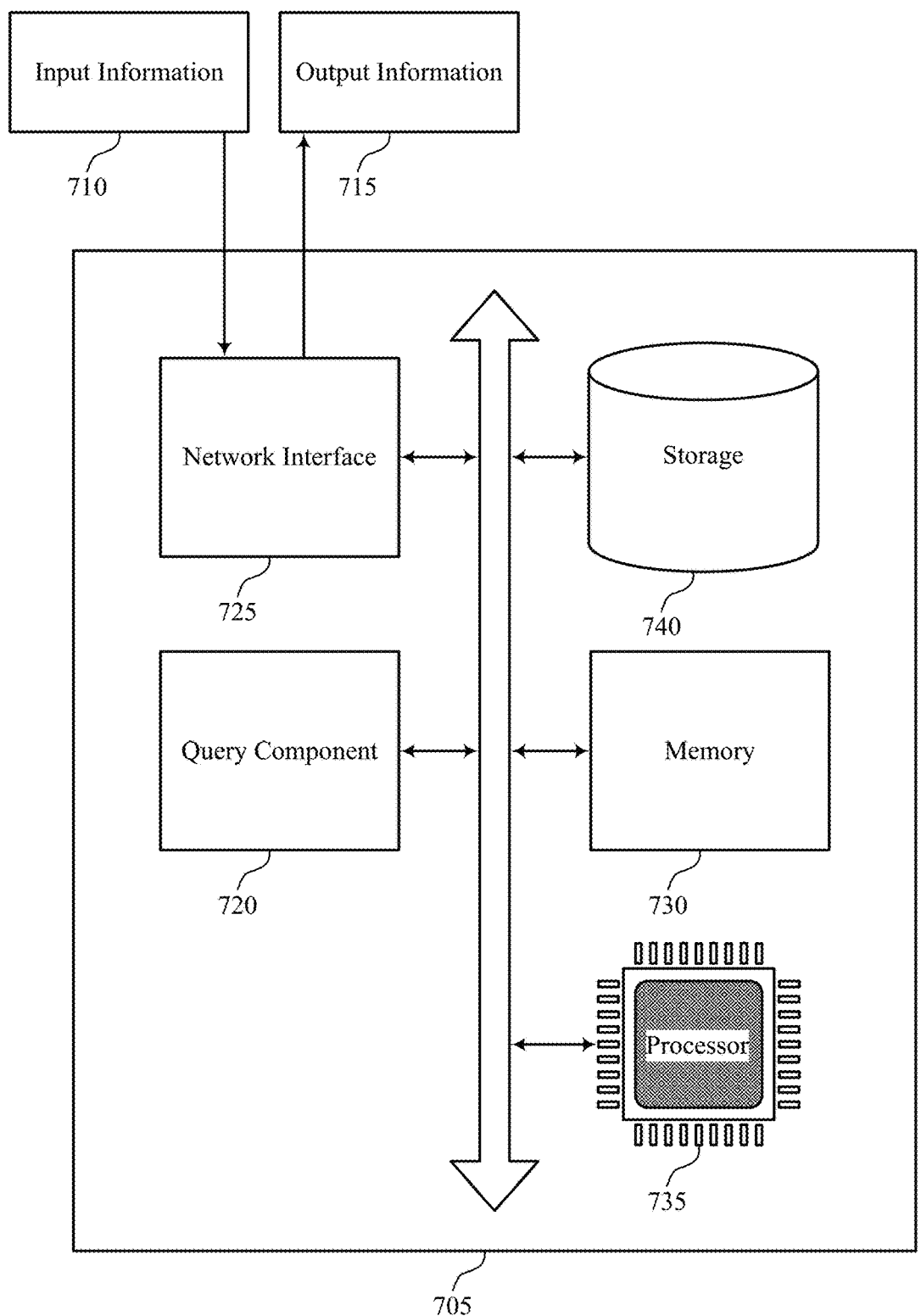
FIG. 7 shows a diagram of a system including a device that supports automatic query optimization in accordance with aspects of the present disclosure.

FIG. 7 shows a block diagram 700 of a system 705 that supports automatic query optimization in accordance with aspects of the present disclosure. The system 705 may be an example of or include the components of a system 405, a system 505, or a DMS as described herein. The system 705 may include components for data management, including components such as a query component 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting automatic query optimization). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the query component 720 may be configured as or otherwise support a means for executing a query, in response to receiving a first instance of the query, to obtain first information from a database that is responsive to the query, where a first execution time associated with execution of the query is greater than a threshold amount of time. The query component 720 may be configured as or otherwise support a means for identifying, in response to the first execution time being greater than the threshold amount of time, an improved version of the query, the improved version associated with a second execution time that is less than or equal to the threshold amount of time. The query component 720 may be configured as or otherwise support a means for storing the improved version of the query. The query component 720 may be configured as or otherwise support a means for retrieving, in response to a receiving a second instance of the query, the improved version of the query from storage. The query component 720 may be configured as or otherwise support a means for executing, after retrieving the improved version of the query from storage, the improved version of the query to obtain second information from the database that is responsive to the query.

By including or configuring the query component 720 in accordance with examples as described herein, the system 705 may support techniques for automatic query optimization, which may provide one or more benefits such as, for example, improved reliability, reduced latency associated with query execution, reduced processing and power consumption, more efficient utilization of computing resources, network resources or both, and improved security, among other possibilities.

Figure 8:
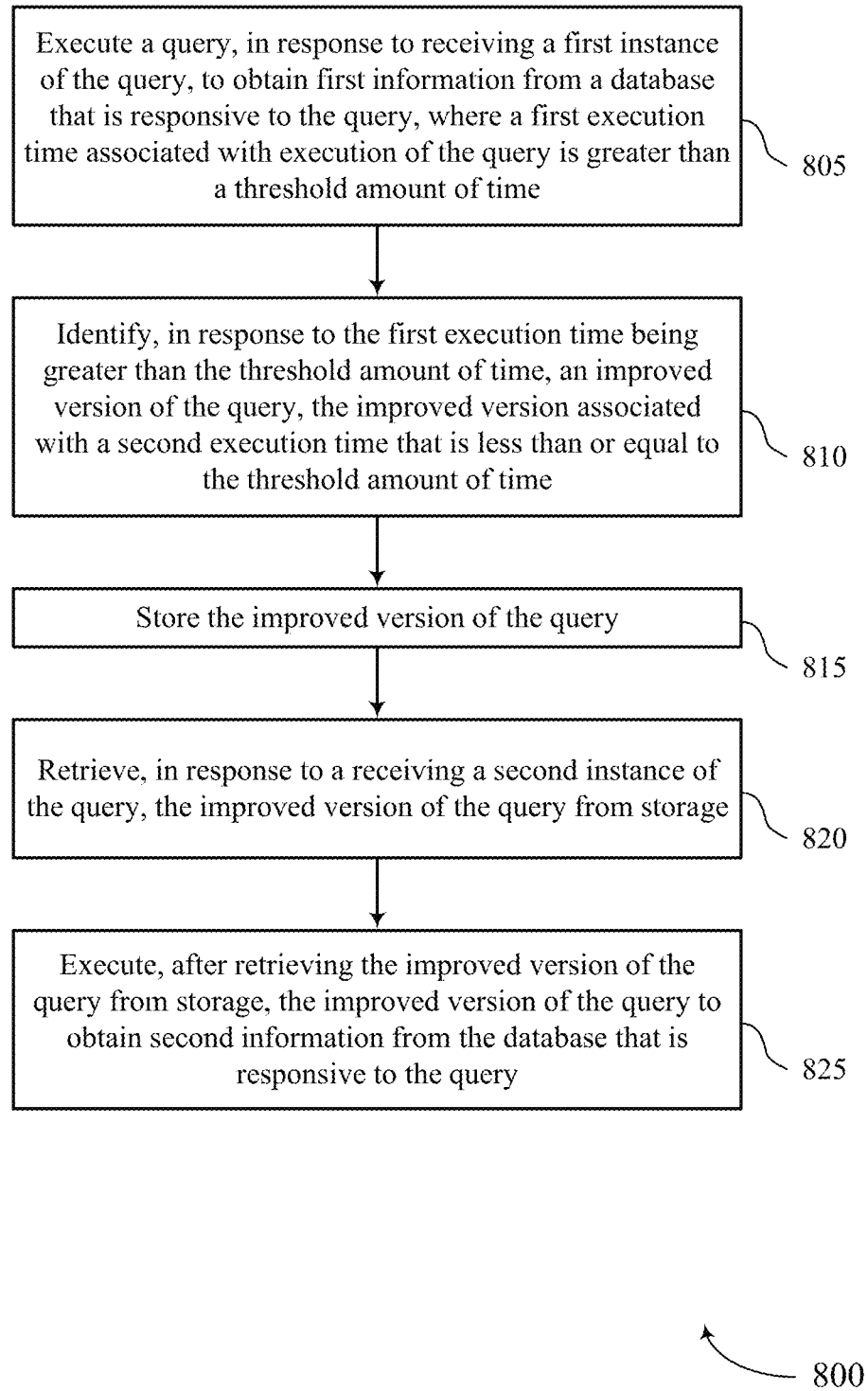
FIGS. 8 through 10 show flowcharts illustrating methods that support automatic query optimization in accordance with aspects of the present disclosure.

FIG. 8 shows a flowchart illustrating a method 800 that supports automatic query optimization in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include executing a query, in response to receiving a first instance of the query, to obtain first information from a database that is responsive to the query, where a first execution time associated with execution of the query is greater than a threshold amount of time. The operations of block 805 may be performed in accordance with examples as disclosed herein. In some examples, aspects of the operations of 805 may be performed by a query execution component 625 as described with reference to FIG. 6.

At 810, the method may include identifying, in response to the first execution time being greater than the threshold amount of time, an improved version of the query, the improved version associated with a second execution time that is less than or equal to the threshold amount of time. The operations of block 810 may be performed in accordance with examples as disclosed herein. In some examples, aspects of the operations of 810 may be performed by a query optimizer 630 as described with reference to FIG. 6.

At 815, the method may include storing the improved version of the query. The operations of block 815 may be performed in accordance with examples as disclosed herein. In some examples, aspects of the operations of 815 may be performed by a query storage component 635 as described with reference to FIG. 6.

At 820, the method may include retrieving, in response to a receiving a second instance of the query, the improved version of the query from storage. The operations of block 820 may be performed in accordance with examples as disclosed herein. In some examples, aspects of the operations of 820 may be performed by a query optimizer 630 as described with reference to FIG. 6.

At 825, the method may include executing, after retrieving the improved version of the query from storage, the improved version of the query to obtain second information from the database that is responsive to the query. The operations of block 825 may be performed in accordance with examples as disclosed herein. In some examples, aspects of the operations of 825 may be performed by a query execution component 625 as described with reference to FIG. 6.

Figure 9:
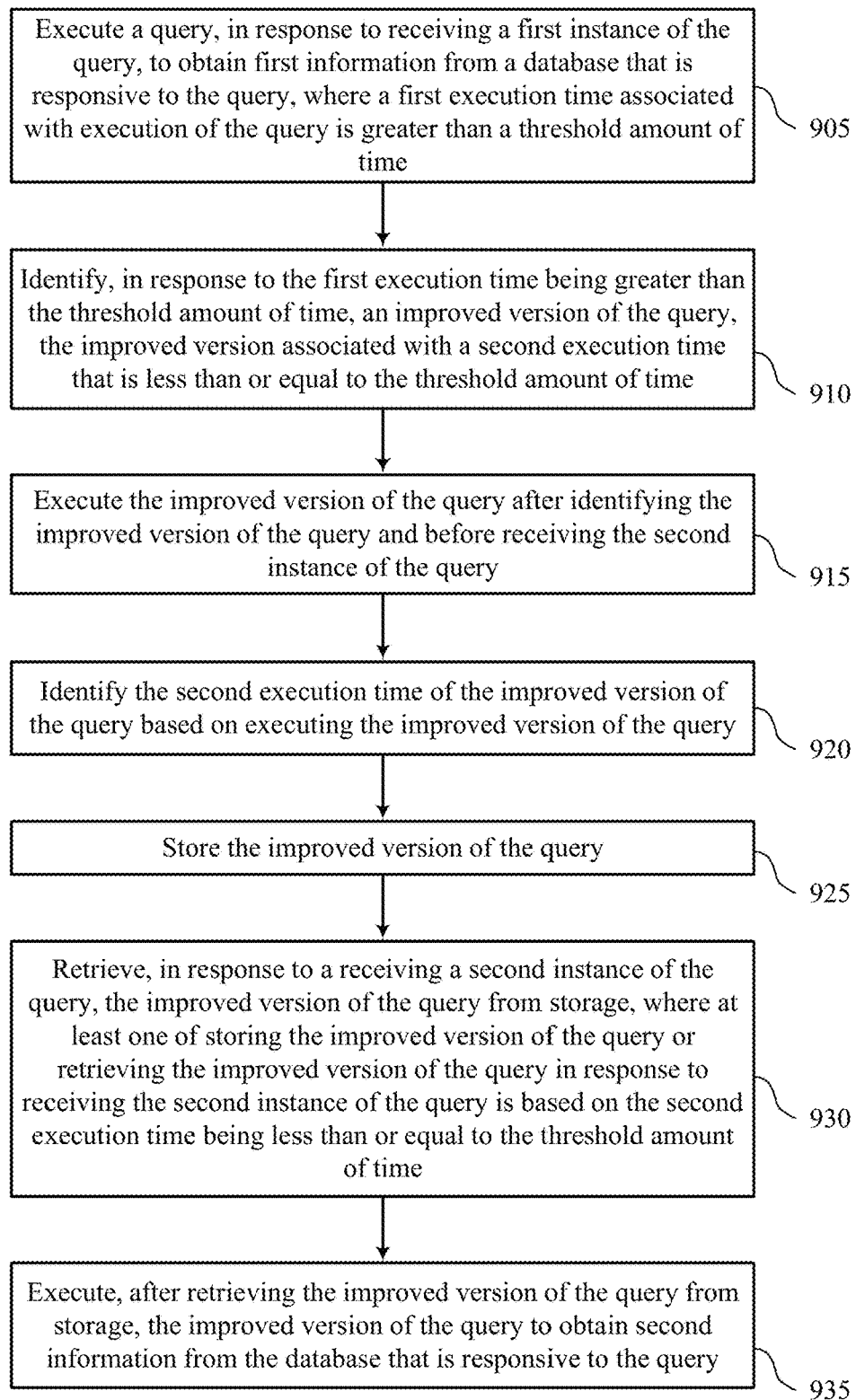

FIG. 9 shows a flowchart illustrating a method 900 that supports automatic query optimization in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include executing a query, in response to receiving a first instance of the query, to obtain first information from a database that is responsive to the query, where a first execution time associated with execution of the query is greater than a threshold amount of time. The operations of block 905 may be performed in accordance with examples as disclosed herein. In some examples, aspects of the operations of 905 may be performed by a query execution component 625 as described with reference to FIG. 6.

At 910, the method may include identifying, in response to the first execution time being greater than the threshold amount of time, an improved version of the query, the improved version associated with a second execution time that is less than or equal to the threshold amount of time. The operations of block 910 may be performed in accordance with examples as disclosed herein. In some examples, aspects of the operations of 910 may be performed by a query optimizer 630 as described with reference to FIG. 6.

At 915, the method may include executing the improved version of the query after identifying the improved version of the query and before receiving the second instance of the query. The operations of block 915 may be performed in accordance with examples as disclosed herein. In some examples, aspects of the operations of 915 may be performed by a query execution component 625 as described with reference to FIG. 6.

At 920, the method may include identifying the second execution time of the improved version of the query based on executing the improved version of the query. The operations of block 920 may be performed in accordance with examples as disclosed herein. In some examples, aspects of the operations of 920 may be performed by an execution time component 640 as described with reference to FIG. 6.

At 925, the method may include storing the improved version of the query. The operations of block 925 may be performed in accordance with examples as disclosed herein. In some examples, aspects of the operations of 925 may be performed by a query storage component 635 as described with reference to FIG. 6.

At 930, the method may include retrieving, in response to a receiving a second instance of the query, the improved version of the query from storage, where at least one of storing the improved version of the query or retrieving the improved version of the query in response to receiving the second instance of the query is based on the second execution time being less than or equal to the threshold amount of time. The operations of block 930 may be performed in accordance with examples as disclosed herein. In some examples, aspects of the operations of 930 may be performed by a query optimizer 630 as described with reference to FIG. 6.

At 935, the method may include executing, after retrieving the improved version of the query from storage, the improved version of the query to obtain second information from the database that is responsive to the query. The operations of block 935 may be performed in accordance with examples as disclosed herein. In some examples, aspects of the operations of 935 may be performed by a query execution component 625 as described with reference to FIG. 6.

Figure 10:
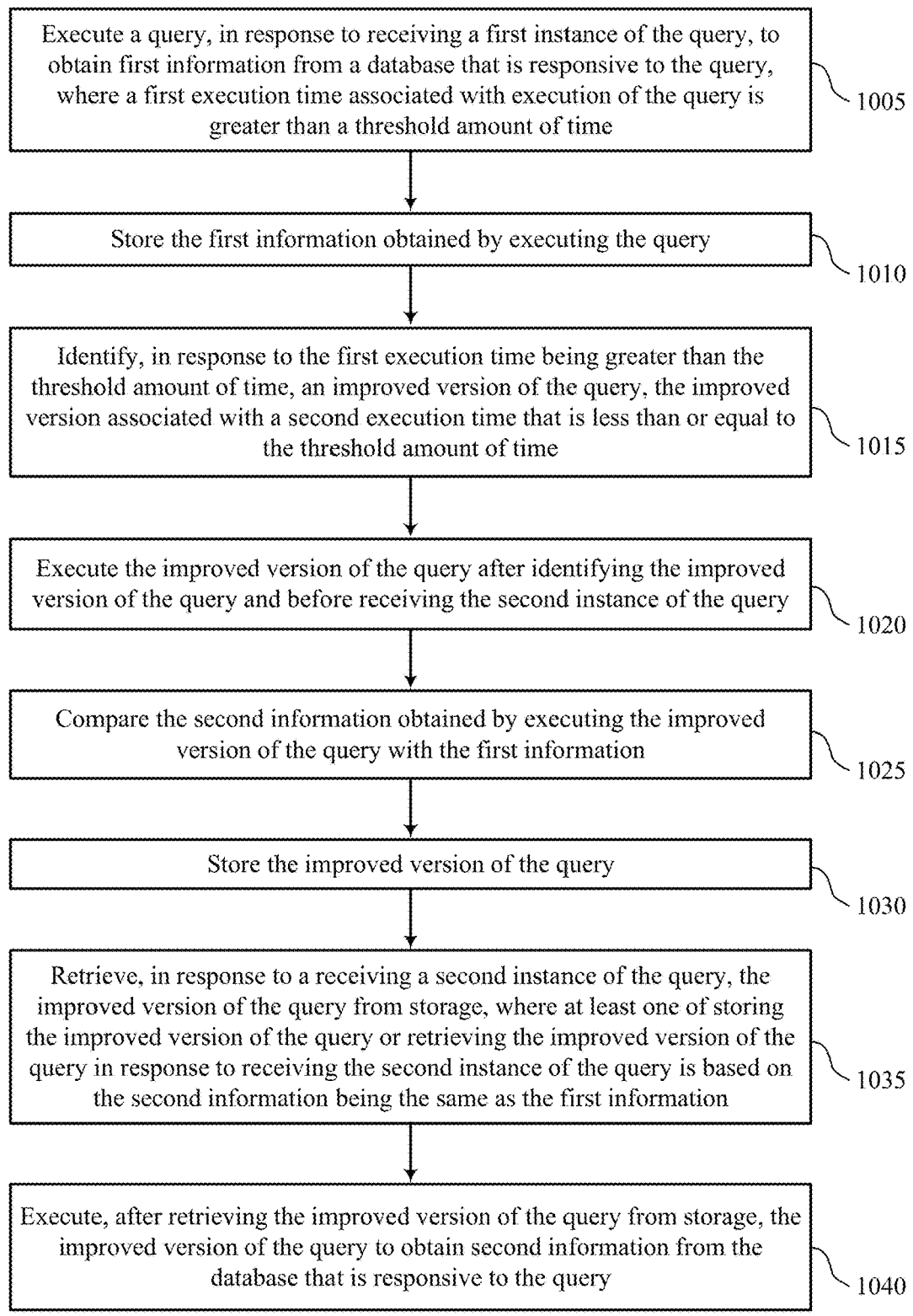

FIG. 10 shows a flowchart illustrating a method 1000 that supports automatic query optimization in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include executing a query, in response to receiving a first instance of the query, to obtain first information from a database that is responsive to the query, where a first execution time associated with execution of the query is greater than a threshold amount of time. The operations of block 1005 may be performed in accordance with examples as disclosed herein. In some examples, aspects of the operations of 1005 may be performed by a query execution component 625 as described with reference to FIG. 6.

At 1010, the method may include storing the first information obtained by executing the query. The operations of block 1010 may be performed in accordance with examples as disclosed herein. In some examples, aspects of the operations of 1010 may be performed by a response storage component 645 as described with reference to FIG. 6.

At 1015, the method may include identifying, in response to the first execution time being greater than the threshold amount of time, an improved version of the query, the improved version associated with a second execution time that is less than or equal to the threshold amount of time. The operations of block 1015 may be performed in accordance with examples as disclosed herein. In some examples, aspects of the operations of 1015 may be performed by a query optimizer 630 as described with reference to FIG. 6.

At 1020, the method may include executing the improved version of the query after identifying the improved version of the query and before receiving the second instance of the query. The operations of block 1020 may be performed in accordance with examples as disclosed herein. In some examples, aspects of the operations of 1020 may be performed by a query execution component 625 as described with reference to FIG. 6.

At 1025, the method may include comparing the second information obtained by executing the improved version of the query with the first information. The operations of block

1025 may be performed in accordance with examples as disclosed herein. In some examples, aspects of the operations of 1025 may be performed by a verification component 650 as described with reference to FIG. 6.

At 1030, the method may include storing the improved version of the query. The operations of block 1030 may be performed in accordance with examples as disclosed herein. In some examples, aspects of the operations of 1030 may be performed by a query storage component 635 as described with reference to FIG. 6.

At 1035, the method may include retrieving, in response to a receiving a second instance of the query, the improved version of the query from storage, where at least one of storing the improved version of the query or retrieving the improved version of the query in response to receiving the second instance of the query is based on the second information being the same as the first information. The operations of block 1035 may be performed in accordance with examples as disclosed herein. In some examples, aspects of the operations of 1035 may be performed by a query optimizer 630 as described with reference to FIG. 6.

At 1040, the method may include executing, after retrieving the improved version of the query from storage, the improved version of the query to obtain second information from the database that is responsive to the query. The operations of block 1040 may be performed in accordance with examples as disclosed herein. In some examples, aspects of the operations of 1040 may be performed by a query execution component 625 as described with reference to FIG. 6.

A method by an apparatus is described. The method may include executing a query, in response to receiving a first instance of the query, to obtain first information from a database that is responsive to the query, where a first execution time associated with execution of the query is greater than a threshold amount of time, identifying, in response to the first execution time being greater than the threshold amount of time, an improved version of the query, the improved version associated with a second execution time that is less than or equal to the threshold amount of time, storing the improved version of the query, retrieving, in response to a receiving a second instance of the query, the improved version of the query from storage, and executing, after retrieving the improved version of the query from storage, the improved version of the query to obtain second information from the database that is responsive to the query.

An apparatus is described. The apparatus may include one or more memories storing processor executable code, and one or more processors coupled with the one or more memories. The one or more processors may individually or collectively operable to execute the code to cause the apparatus to execute a query, in response to receiving a first instance of the query, to obtain first information from a database that is responsive to the query, where a first execution time associated with execution of the query is greater than a threshold amount of time, identify, in response to the first execution time being greater than the threshold amount of time, an improved version of the query, the improved version associated with a second execution time that is less than or equal to the threshold amount of time, store the improved version of the query, retrieve, in response to a receiving a second instance of the query, the improved version of the query from storage, and execute, after retrieving the improved version of the query from storage, the improved version of the query to obtain second information from the database that is responsive to the query.

Another apparatus is described. The apparatus may include means for executing a query, in response to receiving a first instance of the query, to obtain first information from a database that is responsive to the query, where a first execution time associated with execution of the query is greater than a threshold amount of time, means for identifying, in response to the first execution time being greater than the threshold amount of time, an improved version of the query, the improved version associated with a second execution time that is less than or equal to the threshold amount of time, means for storing the improved version of the query, means for retrieving, in response to a receiving a second instance of the query, the improved version of the query from storage, and means for executing, after retrieving the improved version of the query from storage, the improved version of the query to obtain second information from the database that is responsive to the query.

A non-transitory computer-readable medium storing code is described. The code may include instructions executable by a processor to execute a query, in response to receiving a first instance of the query, to obtain first information from a database that is responsive to the query, where a first execution time associated with execution of the query is greater than a threshold amount of time, identify, in response to the first execution time being greater than the threshold amount of time, an improved version of the query, the improved version associated with a second execution time that is less than or equal to the threshold amount of time, store the improved version of the query, retrieve, in response to a receiving a second instance of the query, the improved version of the query from storage, and execute, after retrieving the improved version of the query from storage, the improved version of the query to obtain second information from the database that is responsive to the query.

Some examples of the method, apparatus, and non-transitory computer-readable medium described herein may further include operations, features, means, or instructions for executing the improved version of the query after identifying the improved version of the query and before receiving the second instance of the query and identifying the second execution time of the improved version of the query based on executing the improved version of the query, where at least one of storing the improved version of the query or retrieving the improved version of the query in response to receiving the second instance of the query may be based on the second execution time being less than or equal to the threshold amount of time.

Some examples of the method, apparatus, and non-transitory computer-readable medium described herein may further include operations, features, means, or instructions for storing the first information obtained by executing the query, executing the improved version of the query after identifying the improved version of the query and before receiving the second instance of the query, and comparing the second information obtained by executing the improved version of the query with the first information, where at least one of storing the improved version of the query or retrieving the improved version of the query in response to receiving the second instance of the query may be based on the second information being the same as the first information.

Some examples of the method, apparatus, and non-transitory computer-readable medium described herein may further include operations, features, means, or instructions for generating, in accordance with a hashing function, a fingerprint for the query and storing the fingerprint for the query in a fingerprint database, where the fingerprint database maps the fingerprint for the query to the improved version of the query.

In some examples of the method, apparatus, and non-transitory computer-readable medium described herein, at least one of the fingerprint or the improved version of the query may be associated, within the fingerprint database, with a client from which the first instance of the query may be received.

In some examples of the method, apparatus, and non-transitory computer-readable medium described herein, the fingerprint may be associated, within the fingerprint database, with the database from which the first information and the second information may be obtained.

In some examples of the method, apparatus, and non-transitory computer-readable medium described herein, scanning, in response to receiving the second instance of the query, the fingerprint database for the fingerprint for query, where retrieving the improved version of the query from the storage may be based on the scanning.

Some examples of the method, apparatus, and non-transitory computer-readable medium described herein may further include operations, features, means, or instructions for storing, in a response cache, a fingerprint for the query and the second information obtained in response to the improved version of the query, where the response cache includes one or more fingerprints for one or more queries and one or more sets of information that may be responsive to the one or more queries.

Some examples of the method, apparatus, and non-transitory computer-readable medium described herein may further include operations, features, means, or instructions for identifying a change in at least a portion of the second information in the database and deleting, in response to identifying the change, the second information from the response cache.

Some examples of the method, apparatus, and non-transitory computer-readable medium described herein may further include operations, features, means, or instructions for generating, in accordance with a hashing function, a fingerprint for the query in response to receiving the first instance of the query and scanning a response cache for the fingerprint for the query, where the response cache includes one or more fingerprints for one or more queries and one or more sets of information that may be responsive to the one or more queries, and where executing the query may be based on an absence of the fingerprint in the response cache.

Some examples of the method, apparatus, and non-transitory computer-readable medium described herein may further include operations, features, means, or instructions for generating, in accordance with a hashing function, a fingerprint for the query in response to receiving the first instance of the query and scanning a fingerprint database for the fingerprint for the query, where the fingerprint database includes one or more fingerprints for one or more queries and one or more improved versions of the one or more queries, where executing the query may be based on an absence of the fingerprint in the fingerprint database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary." used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   executing a query, in response to receiving a first instance of the query, to obtain, from a database, first information that is responsive to the query, wherein a first execution time associated with execution of the query is greater than a threshold amount of time;
   identifying, in response to the first execution time being greater than the threshold amount of time, an improved version of the query, the improved version associated with a second execution time that is less than or equal to the threshold amount of time;
   executing the improved version of the query after identifying the improved version of the query;
   verifying the improved version of the query based at least in part on second information obtained by executing the improved version of the query and based at least in part on the first information, wherein the verifying the improved version of the query comprises identifying the second execution time of the improved version of the query based at least in part on executing the improved version of the query;
   storing the improved version of the query based at least in part on the verifying the improved version of the query;
   retrieving, in response to receiving a second instance of the query, the improved version of the query from storage, wherein at least one of storing the improved version of the query or retrieving the improved version of the query in response to receiving the second instance of the query is based at least in part on the second execution time being less than or equal to the threshold amount of time; and
   executing, after the retrieving the improved version of the query from storage, the improved version of the query to obtain the second information from the database that is responsive to the query.

2. The method of claim 1, further comprising:
   storing the first information obtained by executing the query; and
   comparing the second information obtained by executing the improved version of the query with the first information, wherein at least one of storing the improved version of the query or retrieving the improved version of the query in response to receiving the second instance of the query is further based at least in part on the second information being the same as the first information.

3. The method of claim 1, further comprising:
   generating, in accordance with a hashing function, a fingerprint for the query; and
   storing the fingerprint for the query in a fingerprint database, wherein the fingerprint database maps the fingerprint for the query to the improved version of the query.

4. The method of claim 3, wherein at least one of the fingerprint or the improved version of the query is associated, within the fingerprint database, with a client from which the first instance of the query is received.

5. The method of claim 3, wherein the fingerprint is associated, within the fingerprint database, with the database from which the first information and the second information are obtained.

6. The method of claim 3, further comprising:
   scanning, in response to receiving the second instance of the query, the fingerprint database for the fingerprint for query, wherein retrieving the improved version of the query from the storage is based at least in part on the scanning.

7. The method of claim 1, further comprising:
   storing, in a response cache, a fingerprint for the query and the second information obtained in response to the improved version of the query, wherein the response cache comprises one or more fingerprints for one or more queries and one or more sets of information that are responsive to the one or more queries.

8. The method of claim 7, further comprising:
identifying a change in at least a portion of the second information in the database; and
deleting, in response to identifying the change, the second information from the response cache.

9. The method of claim 1, further comprising:
generating, in accordance with a hashing function, a fingerprint for the query in response to receiving the first instance of the query; and
scanning a response cache for the fingerprint for the query, wherein the response cache comprises one or more fingerprints for one or more queries and one or more sets of information that are responsive to the one or more queries, and wherein executing the query is based at least in part on an absence of the fingerprint in the response cache.

10. The method of claim 1, further comprising:
generating, in accordance with a hashing function, a fingerprint for the query in response to receiving the first instance of the query; and
scanning a fingerprint database for the fingerprint for the query, wherein the fingerprint database comprises one or more fingerprints for one or more queries and one or more improved versions of the one or more queries, wherein executing the query is based at least in part on an absence of the fingerprint in the fingerprint database.

11. An apparatus, comprising:
one or more memories storing processor-executable code; and
one or more processors coupled with the one or more memories and individually or collectively operable to execute the code to cause the apparatus to:
execute a query, in response to receiving a first instance of the query, to obtain, from a database, first information that is responsive to the query, wherein a first execution time associated with execution of the query is greater than a threshold amount of time;
identify, in response to the first execution time being greater than the threshold amount of time, an improved version of the query, the improved version associated with a second execution time that is less than or equal to the threshold amount of time;
execute the improved version of the query after identifying the improved version of the query;
verify the improved version of the query based at least in part on second information obtained by executing the improved version of the query and the first information, wherein the verifying the improved version of the query comprises identifying the second execution time of the improved version of the query based at least in part on executing the improved version of the query;
store the improved version of the query based at least in part on the verifying the improved version of the query;
retrieve, in response to receiving a second instance of the query, the improved version of the query from storage, wherein at least one of storing the improved version of the query or retrieving the improved version of the query in response to receiving the second instance of the query is based at least in part on the second execution time being less than or equal to the threshold amount of time; and
execute, after the retrieving the improved version of the query from storage, the improved version of the query to obtain the second information from the database that is responsive to the query.

12. The apparatus of claim 11, wherein the one or more processors are individually or collectively further operable to execute the code to cause the apparatus to:
store the first information obtained by executing the query; and
compare the second information obtained by executing the improved version of the query with the first information, wherein at least one of storing the improved version of the query or retrieving the improved version of the query in response to receiving the second instance of the query is further based at least in part on the second information being the same as the first information.

13. The apparatus of claim 11, wherein the one or more processors are individually or collectively further operable to execute the code to cause the apparatus to:
generate, in accordance with a hashing function, a fingerprint for the query; and store the fingerprint for the query in a fingerprint database, wherein the fingerprint database maps the fingerprint for the query to the improved version of the query.

14. The apparatus of claim 11, wherein the one or more processors are individually or collectively further operable to execute the code to cause the apparatus to:
store, in a response cache, a fingerprint for the query and the second information obtained in response to the improved version of the query, wherein the response cache comprises one or more fingerprints for one or more queries and one or more sets of information that are responsive to the one or more queries.

15. The apparatus of claim 11, wherein the one or more processors are individually or collectively further operable to execute the code to cause the apparatus to:
generate, in accordance with a hashing function, a fingerprint for the query in response to receiving the first instance of the query; and
scan a response cache for the fingerprint for the query, wherein the response cache comprises one or more fingerprints for one or more queries and one or more sets of information that are responsive to the one or more queries, and wherein executing the query is based at least in part on an absence of the fingerprint in the response cache.

16. A non-transitory computer-readable medium storing code, the code comprising instructions executable by one or more processors to:
execute a query, in response to receiving a first instance of the query, to obtain, from a database, first information that is responsive to the query, wherein a first execution time associated with execution of the query is greater than a threshold amount of time;
identify, in response to the first execution time being greater than the threshold amount of time, an improved version of the query, the improved version associated with a second execution time that is less than or equal to the threshold amount of time;
execute the improved version of the query after identifying the improved version of the query;
verify the improved version of the query based at least in part on second information obtained by executing the improved version of the query and the first information, wherein the verifying the improved version of the query comprises identifying the second execution time of the improved version of the query based at least in part on executing the improved version of the query;
store the improved version of the query based at least in part on the verifying the improved version of the query;

retrieve, in response to receiving a second instance of the query, the improved version of the query from storage, wherein at least one of storing the improved version of the query or retrieving the improved version of the query in response to receiving the second instance of the query is based at least in part on the second execution time being less than or equal to the threshold amount of time; and execute, after the retrieving the improved version of the query from storage, the improved version of the query to obtain the second information from the database that is responsive to the query.

17. The non-transitory computer-readable medium of claim 16, wherein the instructions are further executable by the one or more processors to:

store the first information obtained by executing the query; and compare the second information obtained by executing the improved version of the query with the first information, wherein at least one of storing the improved version of the query or retrieving the improved version of the query in response to receiving the second instance of the query is further based at least in part on the second information being the same as the first information.

* * * * *